(12) United States Patent
Gally et al.

(10) Patent No.: US 8,416,154 B2
(45) Date of Patent: Apr. 9, 2013

(54) APPARATUS AND METHOD FOR REDUCING PERCEIVED COLOR SHIFT

(75) Inventors: Brian J. Gally, San Rafael, CA (US); Manish Kothari, Cupertino, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 186 days.

(21) Appl. No.: 13/082,904

(22) Filed: Apr. 8, 2011

(65) Prior Publication Data

US 2011/0254849 A1 Oct. 20, 2011

Related U.S. Application Data

(63) Continuation of application No. 11/077,974, filed on Mar. 11, 2005, now Pat. No. 7,928, 928.

(60) Provisional application No. 60/613,297, filed on Sep. 27, 2004.

(51) Int. Cl.
*G09G 3/00* (2006.01)

(52) U.S. Cl. .............. 345/32; 345/82; 359/291

(58) Field of Classification Search .......... 345/32, 345/76–83, 204; 359/291
See application file for complete search history.

(56) References Cited

U.S. PATENT DOCUMENTS

| | | | |
|---|---|---|---|
| 4,389,096 A | 6/1983 | Hori | |
| 4,441,791 A | 4/1984 | Hornbeck | |
| 4,980,775 A | 12/1990 | Brody | |
| 5,044,736 A | 9/1991 | Jaskie | |
| 5,398,170 A | 3/1995 | Lee | |
| 5,467,216 A * | 11/1995 | Shigeta et al. | 359/263 |
| 5,757,447 A * | 5/1998 | Kobayashi et al. | 349/70 |
| 5,805,117 A | 9/1998 | Mazurek | |
| 5,818,095 A | 10/1998 | Sampsell | |
| 5,835,255 A | 11/1998 | Miles | |
| 5,835,256 A | 11/1998 | Huibers | |
| 5,853,310 A | 12/1998 | Nishimura | |

(Continued)

FOREIGN PATENT DOCUMENTS

| | | |
|---|---|---|
| CA | 2 490 975 | 1/2004 |
| DE | 196 22 748 | 12/1997 |

(Continued)

OTHER PUBLICATIONS

Aratani K. et al. "Surface Micromachined Tuneable Interferometer Array," Sensors and Actuators A, vol. A43, No. 1/3, pp. 17-23, May 1994.

(Continued)

*Primary Examiner* — Kimnhung Nguyen
(74) *Attorney, Agent, or Firm* — Knobbe, Martens, Olson & Bear LLP

(57) ABSTRACT

An apparatus and method for reducing perceived color shift as a function of viewing angle is disclosed. One embodiment is a display device that includes a color light modulator and a color filter. The filter is configured to filter wavelengths of light that would be perceived as color shifted light when reflected by the modulator at an off-axis viewing angle. Another embodiment includes a color light modulator and a color light source configured to provide light having a spectral content that lacks the wavelengths that would be perceived as color shifted light by a view of the display at an off-axis viewing angle. Another embodiment are methods of making such display devices.

46 Claims, 12 Drawing Sheets

U.S. PATENT DOCUMENTS

| | | | |
|---|---|---|---|
| 5,868,480 | A | 2/1999 | Zeinali |
| 5,914,804 | A | 6/1999 | Goossen |
| 5,933,183 | A | 8/1999 | Enomoto |
| 5,986,796 | A | 11/1999 | Miles |
| 5,991,073 | A | 11/1999 | Woodgate et al. |
| 6,031,653 | A | 2/2000 | Wang |
| 6,040,937 | A | 3/2000 | Miles |
| 6,055,090 | A | 4/2000 | Miles |
| 6,088,102 | A | 7/2000 | Manhart |
| 6,282,010 | B1 | 8/2001 | Sulzbach |
| 6,301,000 | B1 | 10/2001 | Johnson |
| 6,356,378 | B1 | 3/2002 | Huibers |
| 6,381,022 | B1 | 4/2002 | Zavracky |
| 6,400,738 | B1 | 6/2002 | Tucker |
| 6,483,613 | B1 | 11/2002 | Woodgate et al. |
| 6,574,033 | B1 | 6/2003 | Chui |
| 6,636,322 | B1 | 10/2003 | Terashita |
| 6,650,455 | B2 | 11/2003 | Miles |
| 6,674,562 | B1 | 1/2004 | Miles |
| 6,760,146 | B2 | 7/2004 | Ikeda et al. |
| 6,768,555 | B2 | 7/2004 | Chen |
| 6,822,780 | B1 | 11/2004 | Long |
| 6,841,787 | B2 | 1/2005 | Almogy |
| 6,867,896 | B2 | 3/2005 | Miles |
| 6,912,022 | B2 | 6/2005 | Lin |
| 6,930,816 | B2 | 8/2005 | Mochizuki |
| 6,967,779 | B2 | 11/2005 | Fadel et al. |
| 7,002,726 | B2 | 2/2006 | Patel |
| 7,009,754 | B2 | 3/2006 | Huibers |
| 7,034,981 | B2 | 4/2006 | Makigaki |
| 7,042,643 | B2 | 5/2006 | Miles |
| 7,072,093 | B2 | 7/2006 | Piehl et al. |
| 7,088,042 | B2 * | 8/2006 | Hirota et al. ............ 313/582 |
| 7,091,523 | B2 * | 8/2006 | Cok et al. ............ 257/79 |
| 7,110,158 | B2 | 9/2006 | Miles |
| 7,113,339 | B2 | 9/2006 | Taguchi et al. |
| 7,123,216 | B1 | 10/2006 | Miles |
| 7,126,738 | B2 | 10/2006 | Miles |
| 7,138,984 | B1 | 11/2006 | Miles |
| 7,142,347 | B2 | 11/2006 | Islam |
| 7,161,730 | B2 | 1/2007 | Floyd |
| 7,172,915 | B2 | 2/2007 | Lin et al. |
| 7,218,429 | B2 | 5/2007 | Batchko |
| 7,304,784 | B2 | 12/2007 | Chui |
| 7,327,510 | B2 | 2/2008 | Cummings et al. |
| 7,342,705 | B2 | 3/2008 | Chui et al. |
| 7,342,709 | B2 | 3/2008 | Lin |
| 7,372,449 | B2 | 5/2008 | Kodama et al. |
| 7,400,439 | B2 | 7/2008 | Holman |
| 7,710,632 | B2 | 5/2010 | Cummings |
| 7,898,521 | B2 | 3/2011 | Gally |
| 7,911,428 | B2 | 3/2011 | Gally |
| 7,928,928 | B2 | 4/2011 | Gally |
| 8,004,743 | B2 | 8/2011 | Mignard |
| 8,031,133 | B2 | 10/2011 | Gally et al. |
| 8,045,252 | B2 | 10/2011 | Chui et al. |
| 8,054,528 | B2 | 11/2011 | Cummings |
| 8,072,402 | B2 | 12/2011 | Xu |
| 8,077,380 | B2 | 12/2011 | Mignard |
| 8,111,445 | B2 | 2/2012 | Chui et al. |
| 2001/0003487 | A1 | 6/2001 | Miles |
| 2001/0049061 | A1 | 12/2001 | Nakagaki |
| 2002/0075555 | A1 | 6/2002 | Miles |
| 2002/0080465 | A1 | 6/2002 | Han |
| 2003/0011864 | A1 | 1/2003 | Flanders |
| 2003/0151821 | A1 | 8/2003 | Favalora |
| 2003/0161040 | A1 | 8/2003 | Ishii |
| 2003/0210363 | A1 | 11/2003 | Yasukawa |
| 2003/0214621 | A1 | 11/2003 | Kim |
| 2004/0066477 | A1 | 4/2004 | Morimoto |
| 2004/0188599 | A1 | 9/2004 | Viktorovitch |
| 2005/0258429 | A1 * | 11/2005 | Cok et al. ............ 257/79 |
| 2006/0022966 | A1 | 2/2006 | Mar |
| 2006/0066935 | A1 | 3/2006 | Cummings |
| 2006/0077127 | A1 | 4/2006 | Sampsell |
| 2006/0077149 | A1 | 4/2006 | Gally |
| 2006/0103912 | A1 | 5/2006 | Katoh |
| 2006/0274243 | A1 | 12/2006 | Iijima et al. |
| 2010/0014148 | A1 | 1/2010 | Djordjev |
| 2011/0128307 | A1 | 6/2011 | Gally et al. |
| 2011/0193770 | A1 | 8/2011 | Gally et al. |
| 2011/0286072 | A1 | 11/2011 | Liu et al. |
| 2012/0026176 | A1 | 2/2012 | Cummings |
| 2012/0062572 | A1 | 3/2012 | Mignard |
| 2012/0099177 | A1 | 4/2012 | Chui et al. |

FOREIGN PATENT DOCUMENTS

| | | |
|---|---|---|
| EP | 0 822 441 | 2/1998 |
| EP | 1 003 062 | 5/2000 |
| EP | 1 640 313 | 3/2006 |
| EP | 1 640 767 | 3/2006 |
| EP | 2 256 537 | 12/2010 |
| EP | 1 800 172 B1 | 2/2011 |
| GB | 2 278 222 | 11/1994 |
| JP | 60-130715 | 7/1985 |
| JP | 61-124923 | 6/1986 |
| JP | 63-309917 | 12/1988 |
| JP | 64-032289 | 2/1989 |
| JP | 03 296720 | 12/1991 |
| JP | 08 018990 | 1/1996 |
| JP | 09-189910 | 7/1997 |
| JP | 10 500224 | 1/1998 |
| JP | 11 174234 | 7/1999 |
| JP | 11 211999 | 8/1999 |
| JP | 2000 500245 | 1/2000 |
| JP | 2000 514568 | 10/2000 |
| JP | 2001 343514 | 12/2001 |
| JP | 2002 062505 A | 2/2002 |
| JP | 2002-229023 | 8/2002 |
| JP | 2002 328313 | 11/2002 |
| JP | 2003 021821 A | 1/2003 |
| JP | 2003-307734 | 10/2003 |
| JP | 2004-205973 | 7/2004 |
| JP | 2004-206049 | 7/2004 |
| JP | 2004-212673 | 7/2004 |
| JP | 2004-212922 | 7/2004 |
| WO | WO 97/17628 | 5/1997 |
| WO | WO 97/46908 | 12/1997 |
| WO | WO 01/81994 | 11/2001 |
| WO | WO 02/24570 | 3/2002 |
| WO | WO 03/007049 | 1/2003 |
| WO | WO 2004/006003 | 1/2004 |
| WO | WO 2006/036519 | 4/2006 |
| WO | WO 2006/036540 | 4/2006 |
| WO | WO 2007/127046 | 11/2007 |

OTHER PUBLICATIONS

Hohlfeld et al., "Micro-machined tunable optical filters with optimized band-pass spectrum," 12th International Conference on Transducers, Solid-State Sensors, Actuators and Microsystems, vol. 2, pp. 1494-1497, Jun. 2003.

Mehregany et al., "MEMS applications in Optical Systems," IEEE/LEOS 1996 Summer Topical Meetings, pp. 75-76, Aug. 1996.

Miles, M.W., "A Mems Based Interferometric Modulator (IMOD) for Display Applications," Proceedings of Sensors Expo, pp. 281-284, Oct. 21, 1997, XP009058455.

Petschick et al. "Fabry-Perot-Interferometer," available at http://pl.physik.tu-berlin.de/groups/pg279/protokolless02/04_fpi.pdf, pp. 50-60, May 14, 2002.

Austrian Search Report for U.S. Appl. No. 11/077,974 dated Jul. 14, 2005.

Office Action U.S. Appl. No. 11/077,974 dated Oct. 3, 2008.

Amendment and Response in U.S. Appl. No. 11/077,974 dated Feb. 2, 2009.

Office Action U.S. Appl. No. 11/077,974 dated May 8, 2009.

Amendment and Response in U.S. Appl. No. 11/077,974 dated Aug. 10, 2009.

Official Communication in U.S. Appl. No. 11/077,974, dated Aug. 31, 2009.

Request for Continued Examination and Amendments in U.S. Appl. No. 11/077,974, dated Sep. 8, 2009.

Examiner Interview Summary in U.S. Appl. No. 11/077,974, dated Sep. 30, 2009.

Applicant Summary of Interview in U.S. Appl. No. 11/077,974, dated Oct. 29, 2009.
Office Action in U.S. Appl. No. 11/077,974 dated Nov. 23, 2009.
Amendment and Response in U.S. Appl. No. 11/077,974 dated Feb. 23, 2010.
Amendment in U.S. Appl. No. 11/077,974, dated Jul. 16, 2010.
Supplemental Amendment in U.S. Appl. No. 11/077,974, dated Oct. 29, 2010.
Amendment After Allowance Under 37 C.F.R. § 1.312 and Issue Fee in U.S. Appl. No. 11/077,974, dated Feb. 1, 2011.
Response to Rule 312 Communication in U.S. Appl. No. 11/077,974, dated Mar. 23, 2011.
Office Action in Chinese Application No. 200510105051.1 dated Mar. 28, 2008.
Office Action in Chinese Application No. 200510105051.1 dated Dec. 19, 2008.
Office Action in Chinese Application No. 2005-10105051, dated Jan. 8, 2010.
Extended Search Report in European Application No. 05255646.1 (Publication No. EP 1 640 313) dated Feb. 6, 2007.
Office Action in European Application No. 05255646.1 dated Oct. 12, 2007.
Office Action in European Application No. 05255646.1, dated Apr. 27, 2009.
Office Action in Japanese Application No. 2005-260607 dated Sep. 30, 2008.
Office Action in Japanese Application No. 2005-260607, dated Nov. 10, 2009.
Office Action in Mexican Application No. PA/a/2005/010242 dated Apr. 17, 2008.
Application as filed in U.S. Appl. No. 13/301,530, filed Nov. 21, 2011.
U.S. Appl. No. 13/270,759, Interferometric Modulator With Dielectric Layer, filed Oct. 11, 2011.
U.S. Appl. No. 12/831,517, Device and Method for Wavelength Filtering, filed Jul. 7, 2010.
U.S. Appl. No. 13/016,107, Device and Method for Wavelength Filtering, filed Jan. 28, 2011.
U.S. Appl. No. 12/637,619, Method and Device for Manipulating Color in a Display, filed Dec. 14, 2009.
U.S. Appl. No. 13/025,870, Method and Device for Manipulating Color in a Display, filed Feb. 11, 2011.
U.S. Appl. No. 13/301,530, Method and Apparatus for Providing Brightness Control in an Interferometric Modulator (IMOD) Display, filed Nov. 21, 2011.
U.S. Appl. No. 13/337,494, Spatial Light Modulator With Integrated Optical Compensation Structure, filed Dec. 27, 2011.
U.S. Appl. No. 12/910,694, Method and Structure Capable of Changing Color Saturation, filed Oct. 22, 2010.

* cited by examiner

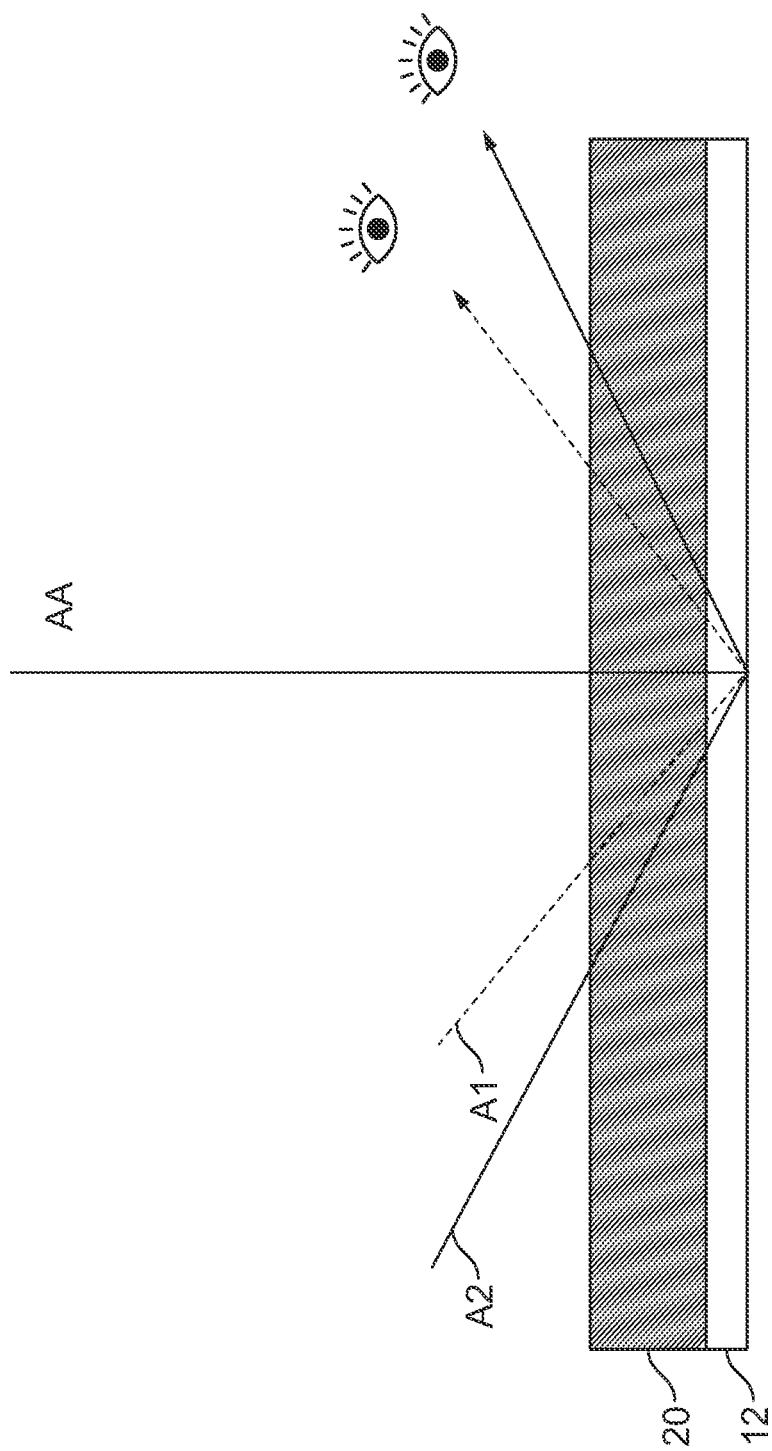

APPARATUS AND METHOD FOR REDUCING PERCEIVED COLOR SHIFT

CROSS-REFERENCE TO RELATED APPLICATIONS

This application is a continuation of U.S. patent application Ser. No. 11/077,974, filed Mar. 11, 2005, entitled "APPARATUS AND METHOD FOR REDUCING PERCEIVED COLOR SHIFT," which claims priority to U.S. Provisional Application No. 60/613,297, filed Sep. 27, 2004, entitled "APPARATUS AND METHOD FOR TUNING THE SPECTRAL RESPONSE OF LIGHT SOURCES FOR INTERFEROMETRIC MODULATORS," and assigned to the assignee hereof. The entire disclosures of the prior applications are considered part of, and are incorporated by reference in, this disclosure.

TECHNICAL FIELD

The field of the invention relates microelectromechanical systems (MEMS).

DESCRIPTION OF THE RELATED TECHNOLOGY

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate; the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

For example, color displays may be fabricated using color display devices such as interferometric modulators that reflect color light. In certain cases, however, the color of light output from the display device varies with angle of view. This phenomena is referred to herein as "color shift." What is needed are designs and methods of reducing this color shift.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Preferred Embodiments" one will understand how the features of this invention provide advantages over other display devices. Embodiments include display devices configured to reduce perceived color shift.

One embodiment is a display device including at least one light-modulating element configured to output colored light. The light-modulating element includes first and second reflective surfaces. The second surface is movable with respect to the first surface. The display device further includes a filter comprising a layer of material that selectively transmits certain visible wavelengths and substantially filters other visible wavelengths when illuminated with white light. The filter is positioned to filter light modulated by the light-modulating element. In one embodiment, the layer of material selectively transmits colored light when illuminated with white light.

Another embodiment is a method of fabricating a display. The method includes forming a light-modulating element configured to output colored light, the color light-modulating element comprising first and second reflective surfaces that form a cavity, the second surface being movable with respect to the first surface. The method further includes positioning a filter comprising a layer of material with respect to the light-modulating element such that the filter filters light modulated by the light-modulating element, the layer of material selectively transmitting certain visible wavelengths and substantially filters other visible wavelengths when illuminated with white light.

Another embodiment is a display system including a light-modulating element configured to output light having at least one spectral peak within the visible spectrum, the light-modulating element comprising first and second reflective surfaces, the second surface being movable with respect to the first surface. The display system further includes a light emitter that outputs visible light having at least one spectral peak within the visible spectrum, the light emitter configured to illuminate the first and second reflective surfaces of the light-modulating element. In one embodiment, the light-modulating element is configured to output colored light. In one embodiment, the light emitter comprises a color light emitter that outputs colored light.

Another embodiment is a method of fabricating a display device. The method includes providing a light-modulating element configured to output light having at least one spectral peak within the visible spectrum, the light-modulating element comprising first and second reflective surfaces, the second surface being movable with respect to the first surface. The method further includes positioning a light emitter with respect to the light-modulating element to illuminate the first and second reflective surfaces of the light-modulating element, the light emitter outputting visible light having at least one spectral peak within the visible spectrum.

Another embodiment is a display device including a plurality of light-modulating elements configured to output colored light, the light-modulating elements comprising first and second reflective surfaces, the second surface being movable with respect to the first surface. The display device further includes a filter array comprising a plurality of filter elements that selectively transmit certain visible wavelengths and substantially filters other visible wavelengths when illuminated with white light, at least two of the filter elements having different transmission spectrums, the filter array positioned to filter light modulated by the light-modulating elements.

Another embodiment is a method of fabricating a display. The method includes forming a plurality of light-modulating elements configured to output colored light, the color light-modulating elements comprising first and second reflective surfaces that form a cavity, the second surface being movable with respect to the first surface. The method further includes positioning a filter array comprising a plurality of filter elements with respect to the light-modulating elements such that the filter array filters light modulated by the plurality of light-modulating elements, at least two of the filter elements having different transmission spectrums.

BRIEF DESCRIPTION OF THE DRAWINGS

FIG. 7 is a side cross-sectional view of an interferometric modulator illustrating optical paths through the modulator for demonstrating color shift.

DETAILED DESCRIPTION

Various embodiments of display devices have reduced color shift. One embodiment is a display device that includes a color light modulator and a color filter. In one embodiment, a way of reducing color shift for off axis viewing of the modulator is to reduce the intensity of light incident upon the display that would be reflected when viewed off axis and perceived as a color shift. In another embodiment, a color light source is configured to provide light having a spectral content that lacks wavelengths that would be reflected by the light modulator when viewed off axis and perceived by the viewer as a color shift.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
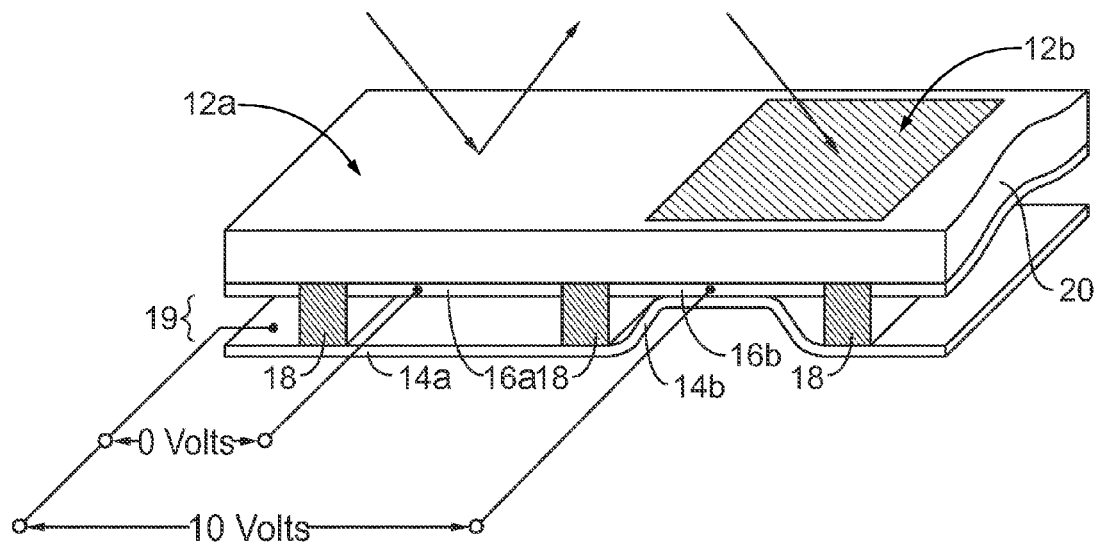
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
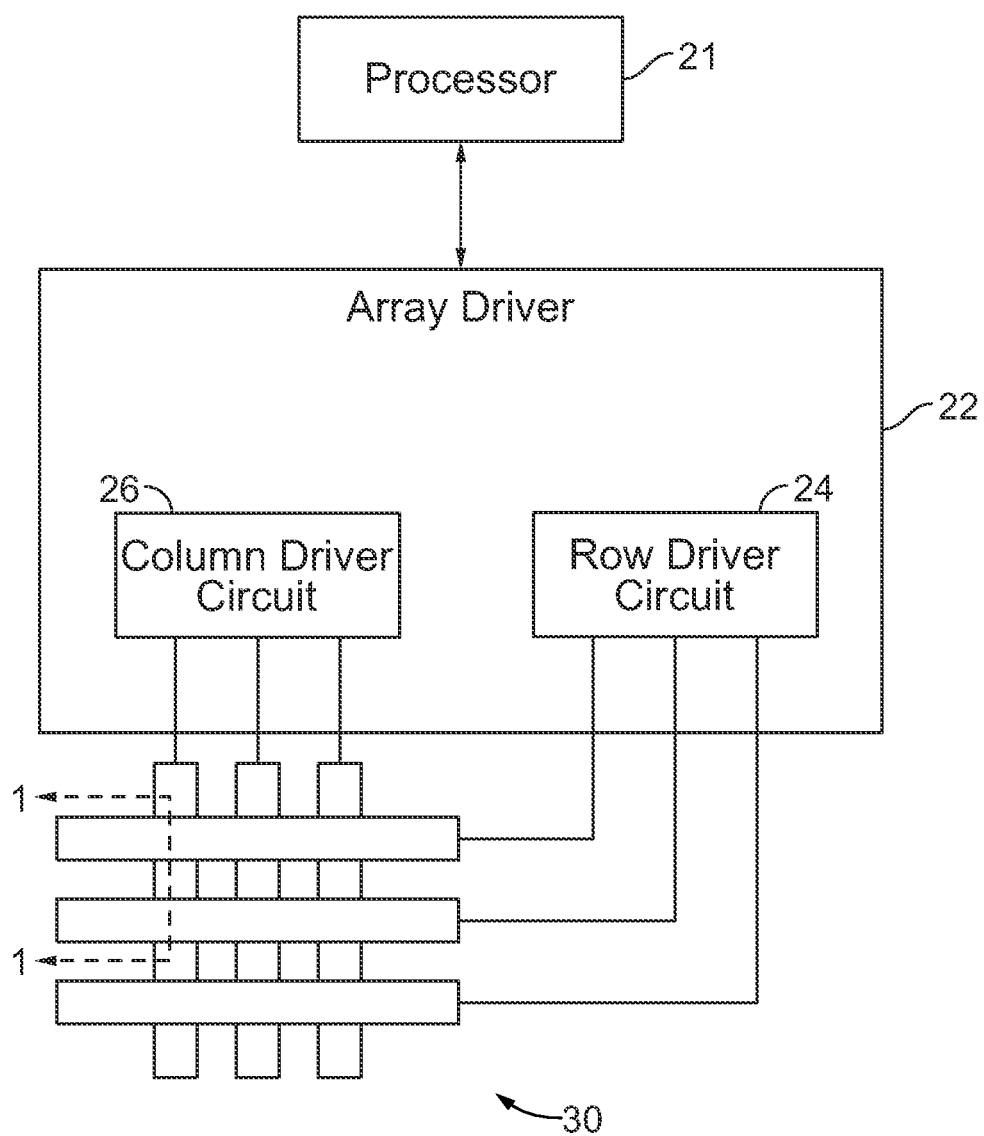
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
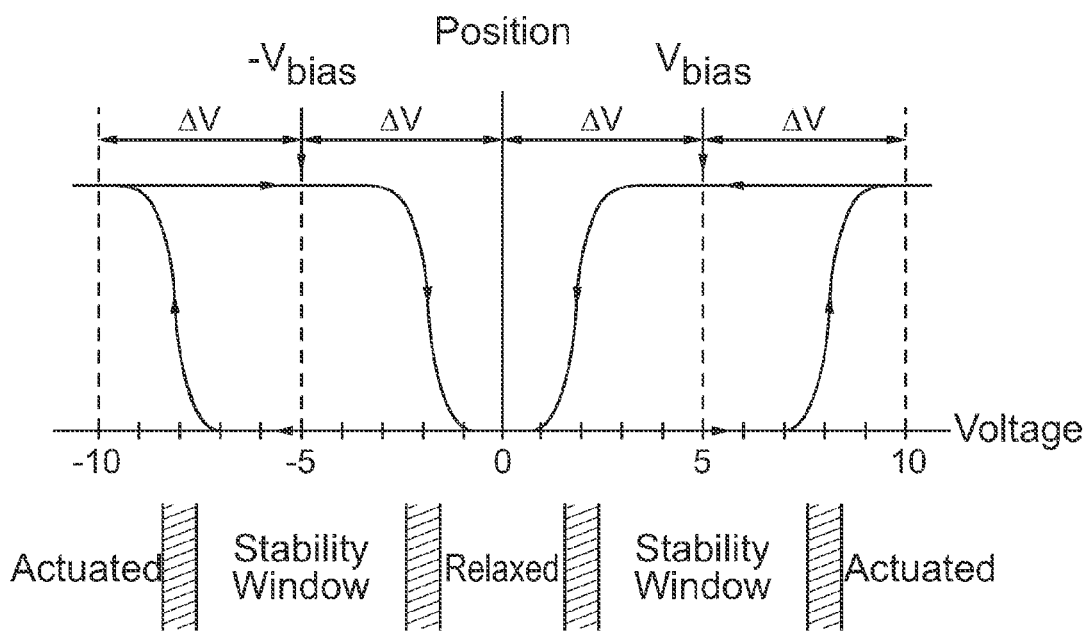
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
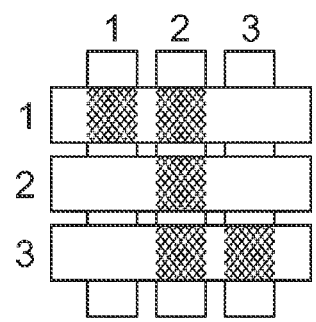
FIGS. 5A and 5B illustrate one exemplary timing diagram for row and column signals that may be used to write a frame of display data to the 3×3 interferometric modulator display of FIG. 2.
Figure 5B:
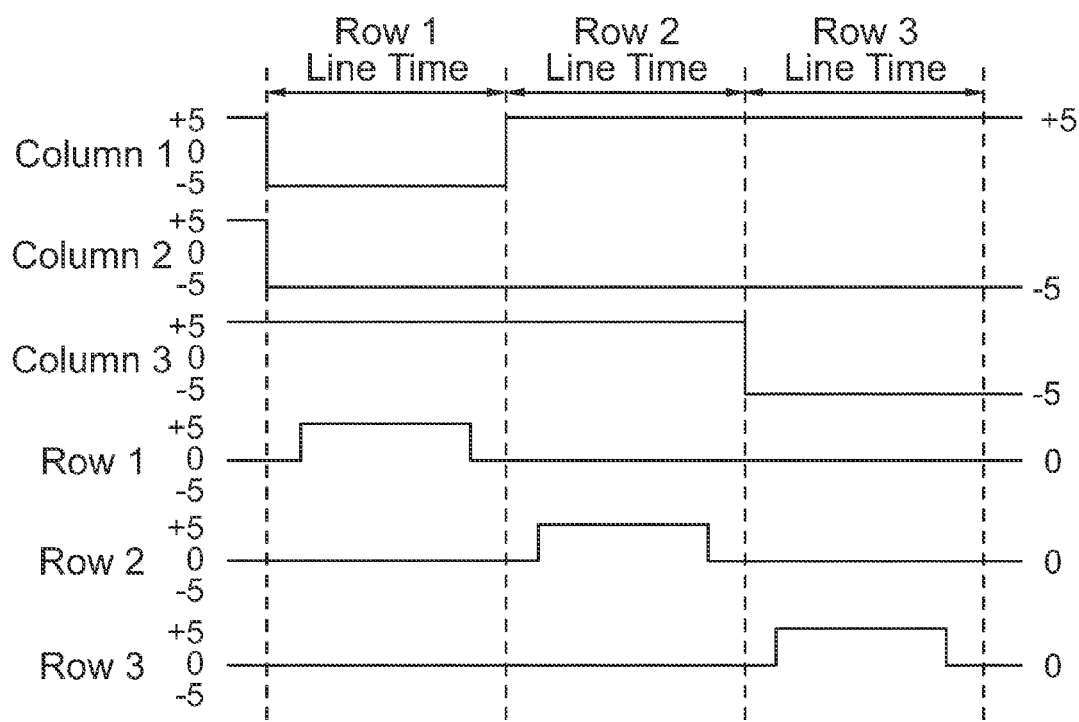

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
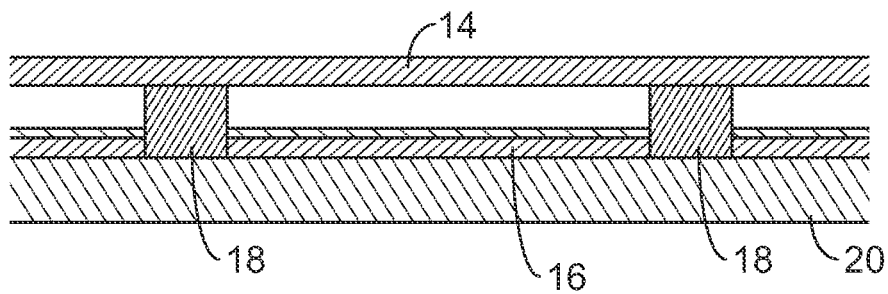
FIG. 6A is a cross section of the device of FIG. 1.
Figure 6B:
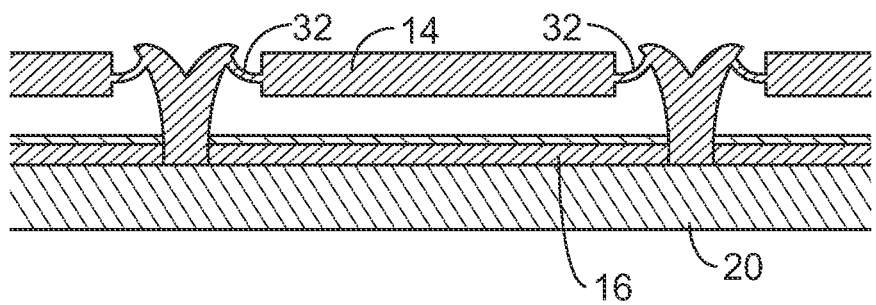
FIG. 6B is a cross section of an alternative embodiment of an interferometric modulator.
Figure 6C:
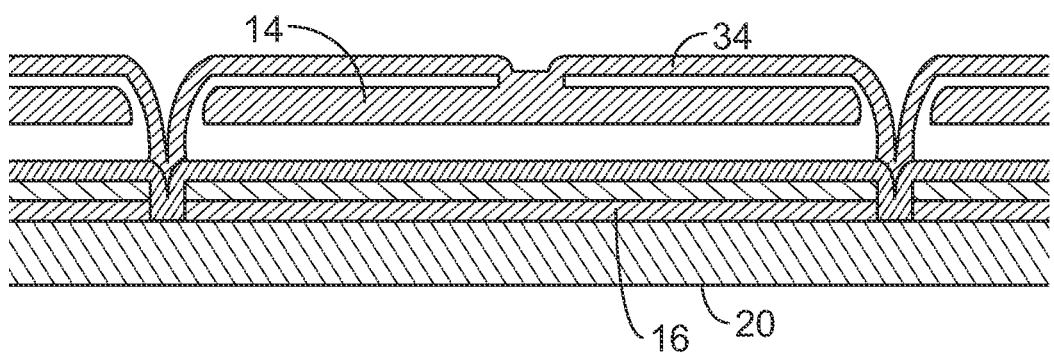
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

FIG. 7 is a side cross-sectional view of an interferometric modulator 12 illustrating optical paths through the modulator 12. The color of light reflected from the interferometric modulator 12 may vary for different angles of incidence (and reflection) with respect to an axis AA as illustrated in FIG. 7. Note that, as used herein, white light generally refers to light having a sufficiently broad spectral content of approximately uniform intensity as to appear to have no particular color to a viewer. Colored light generally refers to light having a sufficiently non-uniform spectral content of visible wavelengths as to appear to have a color to a viewer.

For example, for the interferometric modulator 12 shown in FIG. 7, as light travels along the off-axis path $A_1$, the light is incident on the interferometric modulator at a first angle, reflects from the interferometric modulator, and travels to a viewer. The viewer perceives a first color when the light reaches the viewer as a result of optical interference between a pair of mirrors in the interferometric modulator 12. When the viewer moves or changes his/her location and thus view angle, the light received by the viewer travels along a different off-axis path $A_2$ having corresponding a second different angle of incidence (and reflection). Optical interference in the interferometric modulator 12 depends on the optical path length of light propagated within the modulator. Different optical path lengths for the different optical paths $A_1$ and $A_2$ therefore yield different outputs from the interferometric modulator 12. The user therefore perceives different colors depending on his or her angle of view. As described above, this phenomenon is referred to as a "color shift." This color shift is typically identified with reference to a color produced by an interferometric modulator 12 when viewed along the axis AA.

For some applications, a reduction in brightness at off-angles may be an acceptable trade-off for reducing the degree of color shift at such off-axis view angles. Thus, in one embodiment, a way of reducing color shift for off axis viewing is to reduce the intensity of light incident upon the display that would be reflected and perceived as color shifted light when viewed off axis. This has the effect of reducing the brightness of the display when viewed off axis relative to viewing normal to the display. As described above, the perceived color of the interferometric modulator 12 is a function of viewing angle. In addition, as the interferometric modulator 12 merely reflects, rather than generates light, the color of reflected light is dependent on the color of light received by the interferometric modulator 12. Thus, in one embodiment, the degree of color shift of the interferometric modulator 12 observed by off-axis viewing is reduced by filtering light that is incident on the interferometric modulator 12.

Figure 8:
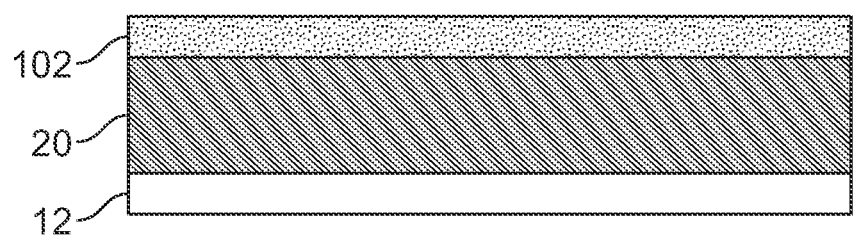
FIG. 8 is a side cross-sectional view of the interferometric modulator having a layer of material for selectively transmitting light of a particular color.

FIG. 8 is a side cross-sectional view of the interferometric modulator 12 having a layer 102 of material for selectively transmitting light of a particular color. The layer 102 of material may include an absorptive color filter. Absorptive filters typically include one or more layers of material that have been doped with a concentration of dye that absorbs particular colors. In one embodiment, the filter comprises dyed photoresist. Exemplary absorptive filter materials are commercially available from several sources, such as International Light, Inc. (Newburyport, Mass. 01950). In embodiments such as illustrated in FIG. 8, the layer 102 of material is positioned so as to filter light incident on the interferometric modulator 12 and light reflected by the interferometric modulator 12. This operation of both incident and reflected light further increases the amount of filtering. In particular, in such embodiments, the layer 102 may be less absorptive of the selected wavelengths of light than would be necessary if light passed through the filter only on the incoming portion of the optical paths of reflected light.

In another embodiment, the layer 102 of material may be positioned with respect to the light modulator so that only light reflected by the modulator passes through the filter. For example, a layer of material that forms a light pipe to guide light to illuminate the interferometric modulator 12 may be positioned between the interferometric modulator 12 and the layer 102 of material so that the layer 102 of material only filters light reflected by the interferometric modulator.

In another embodiment, the layer 102 of material may be positioned so as to filter light from an illumination source before that light is incident on the interferometric modulator 12. In such an embodiment, the layer 102 of material may be placed anywhere in the optical path between the source of illumination and the interferometric modulator 12. In particular, the layer 102 of material may be positioned so that light passes through the layer 102 of material only prior to being reflected by the interferometric modulator 12.

In operation, the layer 102 may be positioned to filter light that is incident light on the interferometric modulator 12, positioned to filter light reflected by the interferometric modulator, or positioned so as to filter incident and reflected light. For example, in FIG. 8, the layer 102 is positioned so as to filter both incident and reflected light. However, in other embodiments, the layer 102 may be positioned relative to a light source or the viewer so as to only filter incident light or reflected light from the interferometric modulator 12.

Figure 9:
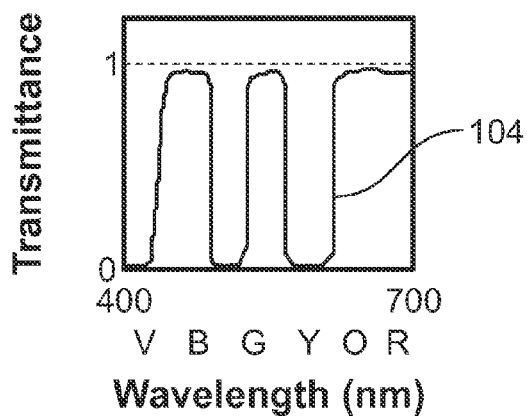
FIG. 9 is a graphical diagram depicting the transmittance of light through an exemplary layer of absorptive material.

FIG. 9 is a graphical diagram depicting the transmittance of light through an exemplary layer 102 of absorptive material. The horizontal axis represents the wavelength of incident light. The vertical axis represents the transmittance of light. A trace 104 depicts the transmittance of the exemplary layer 102 of material. The trace 104 has three transmittance peaks that correspond to wavelength bands associated with primary colors red, green, and blue. In one embodiment, the spectral response of the layer 102 is selected so that the layer 102 substantially reduces the intensity of the shifted wavelengths of light that would resonate within the interferometric cavity when viewed off axis without substantially reducing the intensity of the wavelengths of light that would be reflected when viewed along or near normal incidence.

Figure 10:
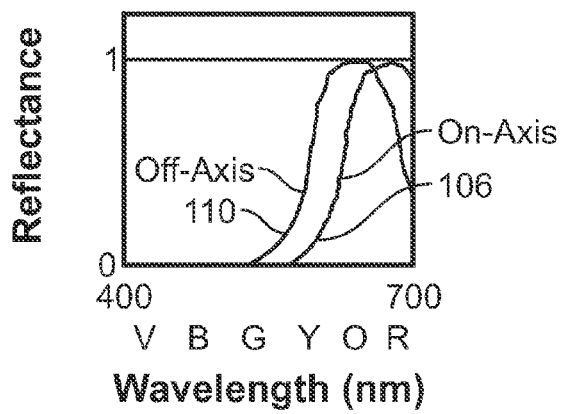
FIG. 10 is a graphical diagram that shows the spectral response of the interferometric modulator when viewed at two positions, one on-axis, and one off-axis thereby illustrating color shift.

FIG. 10 is a graphical diagram in a form similar to FIG. 9, which illustrates the spectral response of the interferometric modulator when viewed at two positions, one on-axis, and one off-axis. In FIG. 10, the vertical represents the reflectance of light from the interferometric modulator 12, rather than transmittance as in FIG. 9. The trace 106 illustrates the on-axis reflectance of the interferometric modulator 12. The trace 106 includes a peak in the spectral response in the range of wavelengths associated with red, i.e., the spectral response is of a "red" interferometric modulator 12. A trace 110 illustrates the reflectance of the red interferometric modulator 12 at one particular off-axis angle of view. The trace 110 includes a peak that is shifted towards the blue portion of the spectrum, e.g., so that the "red" interferometric modulator 12 appears to be orange.

Figure 11:
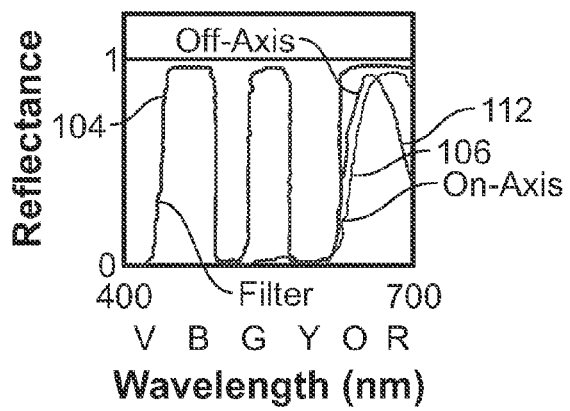
FIG. 11 is a graphical diagram that illustrates the spectral response of the interferometric modulator when viewed at two positions, one on-axis, and one off-axis through an exemplary layer of absorptive material that reduces color shift.

FIG. 11 is a graphical diagram in a form similar to FIG. 9, which illustrates the spectral response of the interferometric modulator 12 when viewed at two positions, one on-axis, and one off-axis, through the layer 102 of absorptive material. In FIG. 10, the vertical axis represents the total fraction of light incident on the interferometric modulator that is both reflected by the interferometric modulator 12 and transmitted by the layer 102. The traces 104 and 106, which illustrate the spectral response of the layer 102 and the "red" interferometric modulator 12, respectively, are shown with reference to a trace 112 which illustrates the spectral response of reflected light of an embodiment of a display that includes the layer 102 and the "red" interferometric modulator 12. As shown by FIG. 11, the peak in the red end of the visible spectrum of the trace 112 falls sharply between the red and orange portions of the spectrum. The red spectral peak of the layer 102 along the trace 104 substantially overlaps the spectral peak of the modulator 12 along the trace 106, e.g., the range of wavelengths over which the peaks extend substantially overlap. Thus, when viewed from off-axis, although the spectral response of the interferometric modulator 12 is shifted toward blue (to the left of FIG. 11), the wavelengths of reflected light that are outside the peak red transmittance band of the layer 102 as illustrated in the trace 104, are filtered out, thus reducing the overall degree of perceived color shift. Because the transmittance of the filter is close to 100% in the portion of the red band that substantially overlaps with the peak of the trace 106, the layer 102 does not substantially reduce the intensity of light reflected by the interferometric modulator when viewed on-axis.

Figure 12:
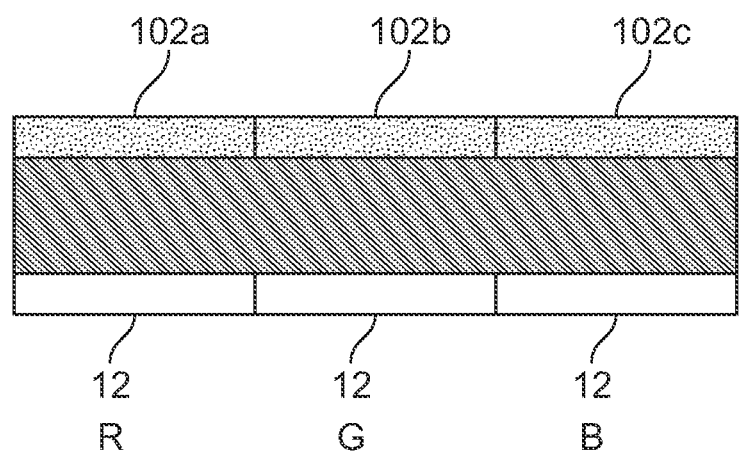
FIG. 12 is a side cross-sectional view of a portion of another embodiment of a color interferometric modulator display, which includes different layers of absorptive material for each of a set of red, green, and blue interferometric modulators.

In one embodiment of a color display including interferometric modulators 12, the display pixels each include one or more red, green, and blue interferometric modulators 12. In one embodiment, the display includes one or more layers 102 having appropriate transmission peaks in each of red, green, and blue. FIG. 12 is a side cross-sectional view of a portion of one embodiment of a color interferometric modulator display, which includes different layers 102*a*, 102*b*, and 102*c* of absorptive material for each of a set of red, green, and blue interferometric modulators 12. Each of the layers 102*a*, 102*b*, and 102*c* may include different materials and/or different thicknesses of material or other parameters so that each layer 102*a*, 102*b*, and 102*c* substantially transmits light of only red, green, and blue, respectively.

In other embodiments, the pixel array 30 comprises monochrome pixels, e.g., all of the interferometric modulators 12 in the pixels reflect light having substantially the same spectral content. In such embodiments, the filter layer 102 selectively transmits the color of the monochrome pixels.

It is to be recognized that while certain embodiments have been discussed with respect to absorptive filters, in other embodiments, other suitable types of color filter may be included. For example, in one embodiment, an interferometric filter is placed between a source of illumination and the interferometric modulator 12 so as to remove wavelengths from the input to the modulator 12 that would be reflected by the modulator 12 and appear to the viewer only when viewed off axis.

In other embodiments, particularly embodiments for use with included light sources rather than ambient lighting, the interferometric modulator 12 may be configured to be illuminated by light having a limited spectral content to reduce perceived off-angle color shift. In particular, in such embodiments, the light source is configured to produce light that does not include the wavelengths of light that appear as shifted light when the modulator 12 is viewed from an off-axis angle of view. For example, one embodiment includes red, green, and blue interferometric modulators 12 paired with a light source illuminating the modulators 12 with red, green, and blue light.

Figure 13:
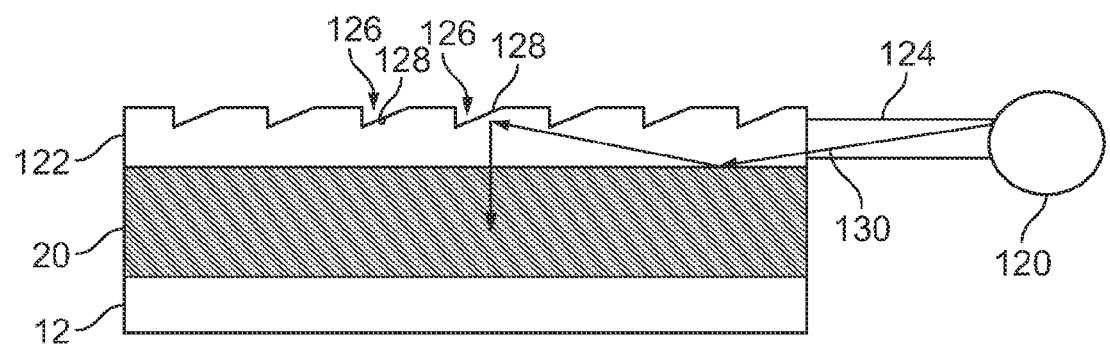
FIG. 13 is a side cross-sectional view of an exemplary display that includes the interferometric modulator and a light source.

FIG. 13 is a side cross-sectional view of an exemplary display that includes the interferometric modulator 12 and a light source 120. In the exemplary display, the light source 120 illuminates the modulator 12 via a light guide plate 122. In one embodiment, a light guide 124 is configured to direct light from the light source 120 to the light guide plate 122. The light guide plate 122 may include grooves 126 that are formed by angled surfaces 128 from which light 130 may be reflected. In one embodiment, the light 130 emitted by light source 120 is maintained within the light guide plate 122 by total internal reflection until the light 130 reflects from the surfaces 128, from which it is reflected through the substrate 20 and into the modulator 12. In other embodiments, any suitable guiding structure may be used. In some embodiments, the light source 120 is a front light positioned to illuminate the interferometric modulator 12. One suitable light source includes one or more color light emitting diodes (LEDs) that have narrow band spectral outputs. For example, suitable LEDs are produced by Nichia Corporation, Mountville, Pa. One such LED is Nichia Corporation, part number NSTM515AS. This LED includes a common anode lead and separate cathode leads for red, blue, and green.

In another embodiment, the light source includes a fluorescent light source, for example, a ultraviolet LED configured to cause suitable phosphors to fluoresce with the desired colors, e.g., red, green, and blue.

Figure 14:
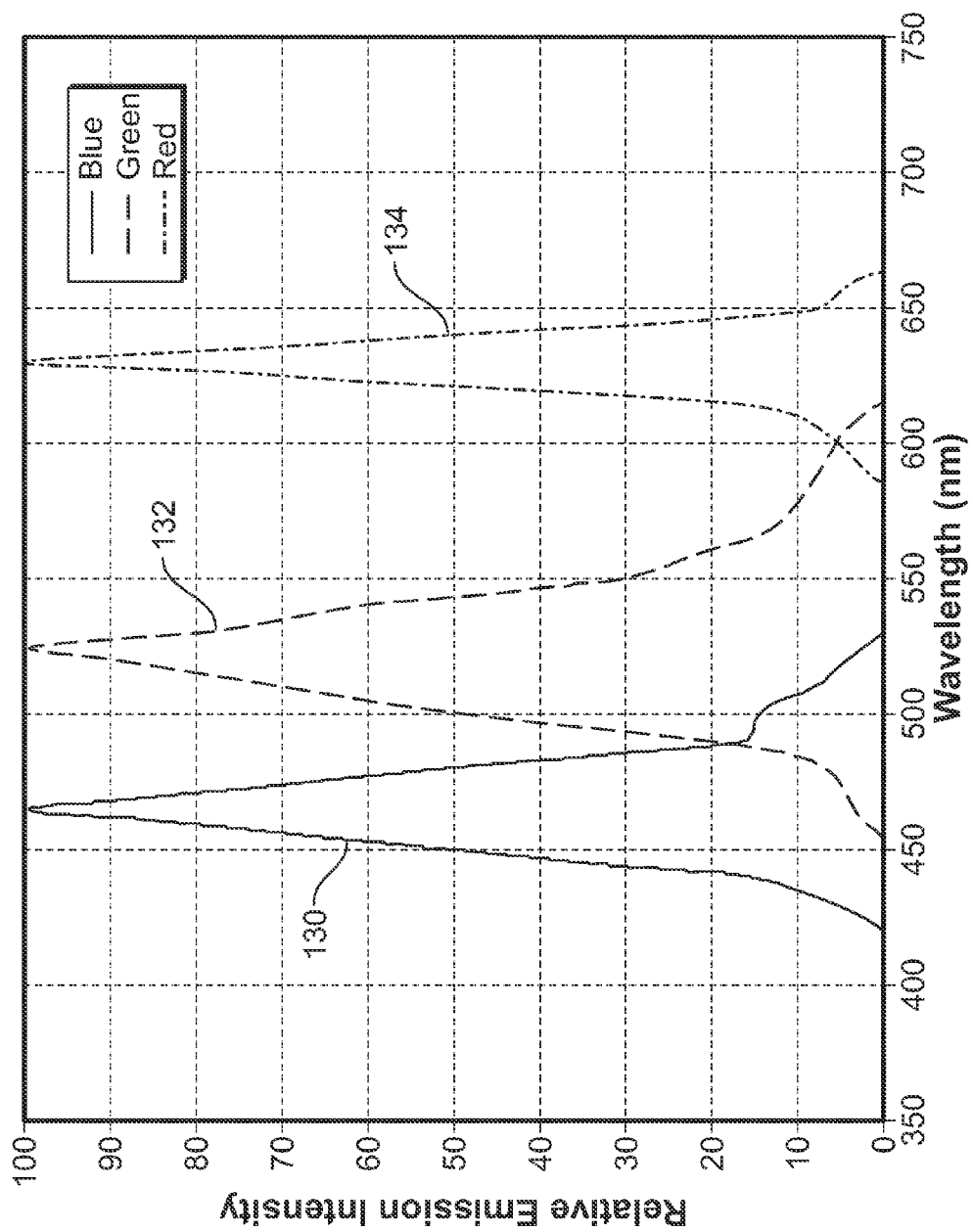
FIG. 14 is a graphical diagram illustrating the spectral response of an exemplary light source.

FIG. 14 is a graphical diagram illustrating the spectral response of an exemplary light source 122. The horizontal axis depicts wavelength of emitted light. The vertical axis depicts the relative emission intensity of an exemplary light source, such as the Nichia NSTM515AS. Traces 130, 132, and 134 illustrate three peaks in the output of the light source at approximately 460, 525, and 630 nm, respectively. These peaks in the traces 130, 132, and 134 correspond to blue, green, and red light. Each of the peaks of the exemplary light source has a width at the half maximum of the peak of approximately 50 nm. Other light sources may have peaks of different widths, such as between 10-100 nm, or 30-60 nm.

Figure 15:
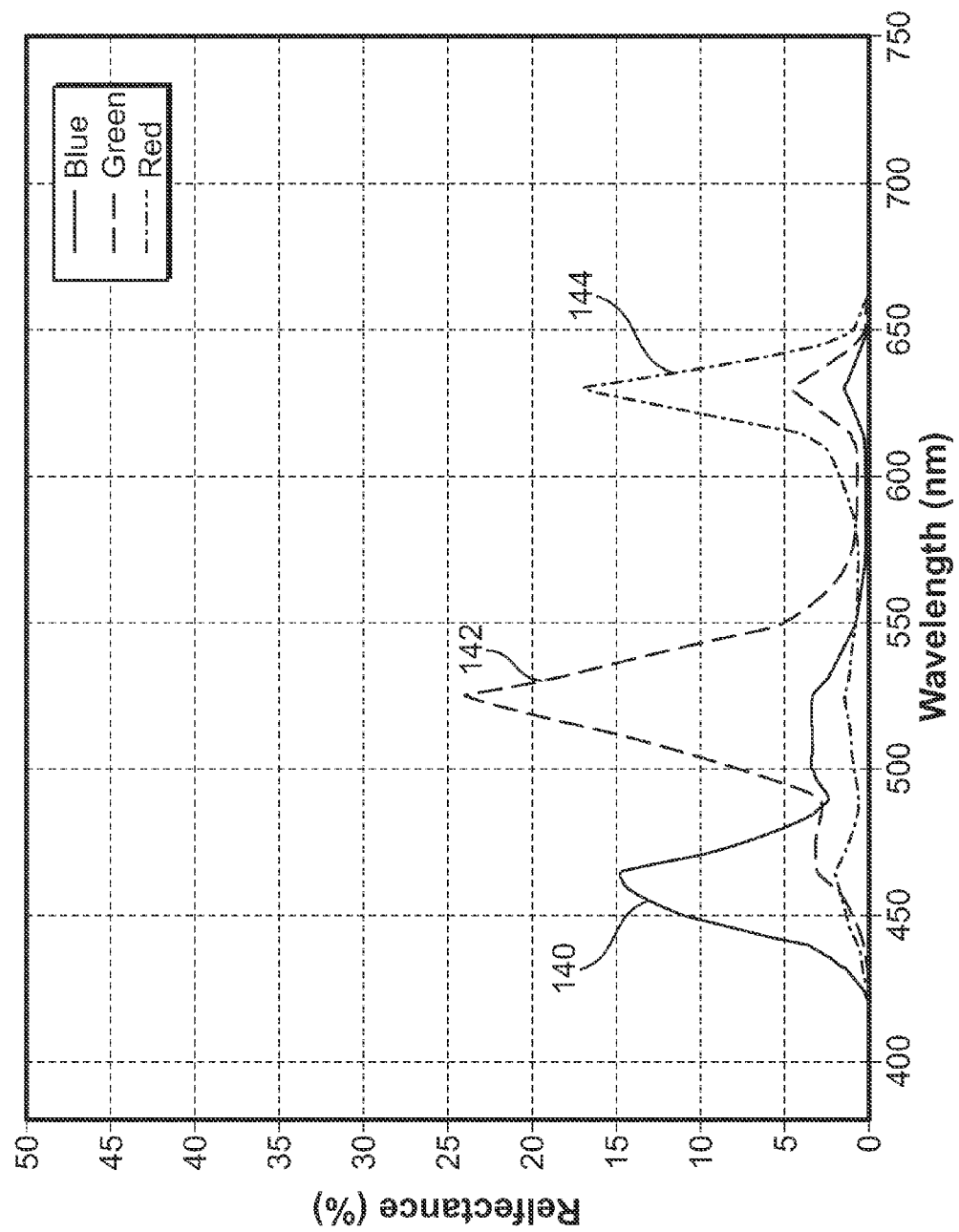
FIG. 15 is a graphical diagram illustrating the spectral response of a display including an interferometric modulator illuminated by the exemplary light source of FIG. 14.

FIG. 15 is a graphical diagram illustrating the spectral response of a display including the interferometric modulator 12 illuminated by the exemplary light source 122 of FIG. 14. The horizontal axis depicts wavelength of reflected light. The vertical axis depicts the reflectivity of light from the interferometric modulators 12. In the illustrated embodiment, the display includes red, green, and blue interferometric modulators. Thus, traces 140, 142, and 144 illustrate the respective responses of the blue, green, and red interferometric modulators when illuminated by the exemplary light source 122. The "blue" trace 140 has a peak centered at 455 nm. The "green" trace 142 has a peak centered at 530 nm. The "red" trace 144 has a peak centered at 615 nm. As the light on the interferometric modulators 12 from the light source 122 is characterized by the sharp peaks illustrated in FIG. 14, the display illustrated in FIG. 15 is characterized by reduced color shift such as shown in FIG. 11 because the light source produces little light for the modulators 12 to reflect when viewed from off-axis angles.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A display device comprising:
   at least one light-modulating element configured to selectively reflect ambient light, the light-modulating element including an optical resonant cavity associated with a first spectral response having a first spectral peak; and
   a filter configured to selectively transmit certain visible wavelengths and to substantially filter other visible wavelengths when illuminated with white light, the filter positioned to filter light modulated by the light-modulating element, the filter having a second spectral response associated with the selectively transmitted visible wavelengths, the second spectral response having a second spectral peak,
   wherein the second spectral response in the vicinity of the second spectral peak substantially overlaps the first spectral response in the vicinity of the first spectral peak.

2. The display device of claim 1, wherein the at least one light-modulating element is configured to output colored light.

3. The display device of claim 2, wherein the display device is configured to reduce variation of color of the output colored light with angle of view.

4. The display device of claim 1, wherein the at least one light-modulating element includes an interferometric modulator.

5. The display device of claim 1, wherein the at least one light-modulating element and the filter are included in a reflective display.

6. The display device of claim 1, wherein the at least one light-modulating element includes first and second surfaces that define the optical resonant cavity, the second surface being movable with respect to the first surface so as to adjust an optical path length of the optical resonant cavity.

7. The display device of claim 6, further comprising electronics configured to drive the second surface such that light reflected by the first and second surfaces can be modulated so as to form part of an image viewable on a display.

8. The display device of claim 1, wherein the first spectral peak includes at least one red, green, or blue spectral peak.

9. The display device of claim 1, wherein the first spectral response includes a plurality of spectral peaks, the first spectral peak being one of the plurality of spectral peaks.

10. The display device of claim 9, wherein the first spectral peak includes a red, green, or blue spectral peak.

11. The display device of claim 1, wherein the filter includes an interferometric filter.

12. The display device of claim 1, wherein the filter is configured to filter light outside the vicinity of the overlapped spectral peaks.

13. The display device of claim 1, wherein the filter transmits substantially 100% of light in the vicinity of the overlapped spectral peaks.

14. The display device of claim 1, wherein light output by the display device along or near normal incidence has a substantially similar intensity as the incident normal light.

15. The display device of claim 1, wherein the second spectral peak substantially overlaps the first spectral peak.

16. The display device of claim 1, wherein the second spectral peak includes at least one red, green, or blue spectral peak.

17. The display device of claim 1, wherein the second spectral response includes a plurality of spectral peaks, the second spectral peak being one of the plurality of spectral peaks.

18. The display device of claim 17, wherein the second spectral peak includes a red, green, or blue spectral peak.

19. The display device of claim 1, further comprising:
   a processor that is configured to communicate with the at least one light-modulating element, the processor being configured to process image data; and
   a memory device that is configured to communicate with the processor.

20. The display device of claim 19, further comprising:
   a driver circuit configured to send at least one signal to the at least one light-modulating element.

21. The display device of claim 20, further comprising:
   a controller configured to send at least a portion of the image data to the driver circuit.

22. The display device of claim 19, further comprising:
   an image source module configured to send the image data to the processor.

23. The display device of claim 22, wherein the image source module includes at least one of a receiver, transceiver, and transmitter.

24. The display device of claim 19, further comprising:
an input device configured to receive input data and to communicate the input data to the processor.

25. A display device comprising:
means for modulating incident light configured to selectively reflect ambient light, the light-modulating means including an optical resonant cavity associated with a first spectral response having a first spectral peak; and
means for selectively transmitting certain visible wavelengths and substantially filtering other visible wavelengths when illuminated with white light, the means for selectively transmitting positioned to filter light modulated by the light-modulating means, the means for selectively transmitting having a second spectral response associated with the selectively transmitted visible wavelengths, the second spectral response having a second spectral peak,
wherein the second spectral response in the vicinity of the second spectral peak substantially overlaps the first spectral response in the vicinity of the first spectral peak.

26. The display device of claim 25, wherein the light-modulating means includes an interferometric modulator.

27. The display device of claim 25, wherein the light-modulating means and the selectively transmitting means are included in a reflective display.

28. The display device of claim 25, wherein the light-modulating means includes first and second surfaces that define the optical resonant cavity, the second surface being movable with respect to the first surface so as to adjust an optical path length of the optical resonant cavity.

29. The display device of claim 28, further comprising electronics configured to drive the second surface such that light reflected by the first and second surfaces can be modulated so as to form part of an image viewable on a display.

30. The display device of claim 25, wherein the first spectral response includes a plurality of spectral peaks, the first spectral peak being one of the plurality of spectral peaks.

31. The display device of claim 25, wherein the means for selectively transmitting includes an absorptive filter or an interferometric filter.

32. The display device of claim 25, wherein the means for selectively transmitting is configured to filter light outside the vicinity of the overlapped spectral peaks.

33. The display device of claim 25, wherein the means for selectively transmitting transmits substantially 100% of light in the vicinity of the overlapped spectral peaks.

34. The display device of claim 25, wherein the second spectral peak substantially overlaps the first spectral peak.

35. The display device of claim 25, wherein the second spectral response includes a plurality of spectral peaks, the second spectral peak being one of the plurality of spectral peaks.

36. A method of fabricating a display device, the method comprising:
forming at least one light-modulating element configured to selectively reflect ambient light, the light-modulating element including an optical resonant cavity associated with a first spectral response having a first spectral peak; and
positioning a filter configured to selectively transmit certain visible wavelengths and to substantially filter other visible wavelengths when illuminated with white light, the filter positioned to filter light modulated by the light-modulating element, the filter having a second spectral response associated with the selectively transmitted visible wavelengths, the second spectral response having a second spectral peak,
wherein the second spectral response in the vicinity of the second spectral peak substantially overlaps the first spectral response in the vicinity of the first spectral peak.

37. The method of claim 36, wherein the at least one light-modulating element includes an interferometric modulator.

38. The method of claim 36, wherein the at least one light-modulating element and the filter are included in a reflective display.

39. The method of claim 36, wherein forming at least one light-modulating element includes forming first and second surfaces that define the optical resonant cavity, the second surface being movable with respect to the first surface so as to adjust an optical path length of the optical resonant cavity.

40. The method of claim 39, further comprising providing electronics configured to drive the second surface such that light reflected by the first and second surfaces can be modulated so as to form part of an image viewable on a display.

41. The method of claim 36, wherein the first spectral response includes a plurality of spectral peaks, the first spectral peak being one of the plurality of spectral peaks.

42. The method of claim 36, wherein the filter includes an interferometric filter.

43. The method of claim 36, wherein the filter is configured to filter light outside the vicinity of the overlapped spectral peaks.

44. The method of claim 36, wherein the filter transmits substantially 100% of light in the vicinity of the overlapped spectral peaks.

45. The method of claim 36, wherein the second spectral peak substantially overlaps the first spectral peak.

46. The method of claim 36, wherein the second spectral response includes a plurality of spectral peaks, the second spectral peak being one of the plurality of spectral peaks.

* * * * *